United States Patent [19]

Clément et al.

[11] Patent Number: 4,523,884

[45] Date of Patent: Jun. 18, 1985

[54] REMOTE MANIPULATION ASSEMBLY

[75] Inventors: Gilles Clément, Paris; Daniel François, Vendome; Paul Marchal, Gif Sur Yvette; Claude Moreau, Nantes, all of France

[73] Assignee: Commissariat A L'Energie Atomique, Paris, France

[21] Appl. No.: 309,604

[22] Filed: Oct. 8, 1981

[30] Foreign Application Priority Data

Oct. 17, 1980 [FR] France .............................. 80 22328

[51] Int. Cl.³ ................................................. B25T 3/00
[52] U.S. Cl. ........................................ 414/8; 414/735; 414/909
[58] Field of Search ...................... 414/1, 8, 718, 719, 414/720, 735, 909; 49/477, 485

[56] References Cited

U.S. PATENT DOCUMENTS 3,247,979  4/1966  Melton et al. ...................... 414/735

FOREIGN PATENT DOCUMENTS 1260036  3/1962  France .
1367849  6/1964  France .
1494950  8/1967  France .
1596421  7/1970  France .
2090243  1/1972  France .

OTHER PUBLICATIONS

Telescoping Carrier, Hot Laboratory Equipment, Oak Ridge National Laboratory, I. G. Stang.

*Primary Examiner*—Robert J. Spar
*Assistant Examiner*—Donald W. Underwood
*Attorney, Agent, or Firm*—Pearne, Gordon, Sessions, McCoy, Granger & Tilberry

[57] ABSTRACT

Remote manipulating assembly of the type comprising a movable platform carrying a telescopic supporting or carrying assembly at the end of which a remote manipulation arm can be displaced within an enclosure, wherein the platform is located within a wall of the enclosure, at least one opening being provided in the wall to permit the introduction of the telescopic carrying assembly of axis AA into the enclosure, and wherein the platform is provided with a hood within which the telescopic carrying assembly and the remote manipulation arm can be completely contained, the hood also being provided in its opening part with means for the tight connection to the wall of the enclosure cooperating with sealing means provided in the opening, and having at its other end means for controlling the displacements of the telescopic carrying assembly, while also having connection and supply means for the displacements of the remote manipulation arm, together with its operation and the operation of its tools.

The invention also relates to a process for connecting a remote manipulation assembly to the opening of an enlcosure.

The present remote manipulation assembly is intended for working in hostile or dangerous environments, particularly in the nuclear field.

4 Claims, 7 Drawing Figures

REMOTE MANIPULATION ASSEMBLY

BACKGROUND OF THE INVENTION

The present invention relates to a remote manipulation assembly mounted on a movable platform and comprising a telescopic supporting assembly retractable into a tightly sealed hood.

Various types of manipulators are known and they are used in hostile or dangerous media, particularly in the nuclear field for remotely carrying out various manipulating or handling operations.

Remote manipulating assemblies are known which are carried by gantries comprising a generally vertical telescoping or girder device at the end of which a manipulating arm can be displaced within a room forming a hot cell when the manipulator is intended for use in a radioactive enclosure, or a workshop or test bay if the said manipulator is intended to carry out other industrial functions.

In addition, remote manipulating systems are known which are carried by different devices integral with a vehicle bearing or resting on the ground. These systems are intended for occasional use and must be able to enter a nuclear or non-nuclear working zone. The intervention vehicles are essentially limited to access at ground level. In addition, intermediate systems between the two aforementioned systems are known which, by transfer on vertical or horizontal moving beams, make it possible to introduce a system which is equivalent to the first having a less occasional function than the first mentioned means, so that use thereof is possible in a series of similar rooms able to receive the same moving beam. However, particularly in the case of installations working on radioactive products, installations exist where access by the ground is not possible and there are even certain installations having no incorporated handling means. The latter zones are static equipment cells such as exist in numerous chemical installations which only contain manifolds vessels. In connection with the latter, completely blind rooms or areas are frequently encountered with which no remote operation means is associated in normal operation.

For the purpose of intervening without fixed means in the enclosure or in accidental circumstances or for dismantling at the end of use of such installations, the latter being of particular interest in connection with dismantling nuclear installations when they become obsolete, it is at the same time necessary to have possibly more sensitive manipulation means having a higher dexterity level than the routine production installation means. At the same time, it is necessary to obtain access to these rooms and areas by the only opening which exists and which is located in the roof.

BRIEF SUMMARY OF THE INVENTION

The present invention therefore relates to a remote manipulating assembly of the type comprising a movable platform carrying a telescopic supporting or carrying assembly at the end of which a remote manipulation arm can be displaced within an enclosure wherein the platform is located on a wall of the enclosure, at least one opening being provided in the wall to permit the introduction of the telescopic carrying assembly of axis AA into the enclosure, and wherein the platform is provided with a hood within which the telescopic carrying assembly and the remote manipulation arm can be completely contained, the hood also being provided in its opening part with means for the tight connection to the wall of the enclosure cooperating with sealing means provided in the opening, and having at its other end means for controlling the displacements of the telescopic carrying assembly, whilst also having connection and supply means for the displacements of the remote manipulation arm, together with its operation and the operation of its tools.

Generally, the wall of the enclosure through which intervention takes place is its roof. In this particularly favourable case, the axis of the remote manipulation assembly is vertical. However, the available height beneath the ceiling of the access rooms or areas is generally limited. Moreover, the enclosure in which intervention is to take place may have dimensions considerably greater than the available height beneath the ceiling of the access rooms or areas, no matter whether this is in depth or in horizontal size. Thus, the telescopic carrying assembly equipping the remote manipulation assembly according to the invention is preferably a doubly telescopic device. It comprises a primary telescopic carrying means and a secondary telescopic carrying means sliding within the primary telescopic carrying means.

More specifically, the carrying assembly is constituted by a primary telescopic carrying means sliding within the hood and which comprises at least one sleeve whose length is equal to the free internal height of the hood and a carrying carriage moving within the inner sleeve of the primary telescopic carrying means and carrying on its inner end a secondary telescopic carrying means having at its opposite end a support for the orientation and transverse displacement of the remote manipulation arm with respect to axis (AA).

In order to permit good accessibility for the remote manipulation arm, the orientation and displacement support has at least three degrees of liberty. This support comprises an actuator permitting a rotary movement about an axis substantially coinciding with axis (AA) of the carrying assembly, an actuator permitting a pivoting movement about a shoulder axis substantially perpendicular to axis (AA) of the carrying assembly and an actuator permitting a pivoting movement about a fork axis parallel to the shoulder axis.

If it is necessary to increase the accessibility distance outside axis (AA), the orientation and displacement support preferably comprises an actuator controlling a telescopic movement substantially in accordance with the longitudinal axis of the fork.

Moreover, when the enclosure contains a radioactive atmosphere and its sources, it is indispensible to also carry out the penetration of the roof in an area which is protected and clean without exposing personnel to radiation or transferring contamination during the exit of the remote manipulation assembly. It is therefore necessary for the assembly to have connection means beneath shielding and permanent confinement on the roof of the enclosure. Preferably, these means comprise a closing device moving in translation within a casing fixed to the lower surface of the hood and a flange sealingly connected to the lower surface of the hood and provided with raising and lowering means and matching with a flange integral with the wall i.e. roof.

BRIEF SUMMARY OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
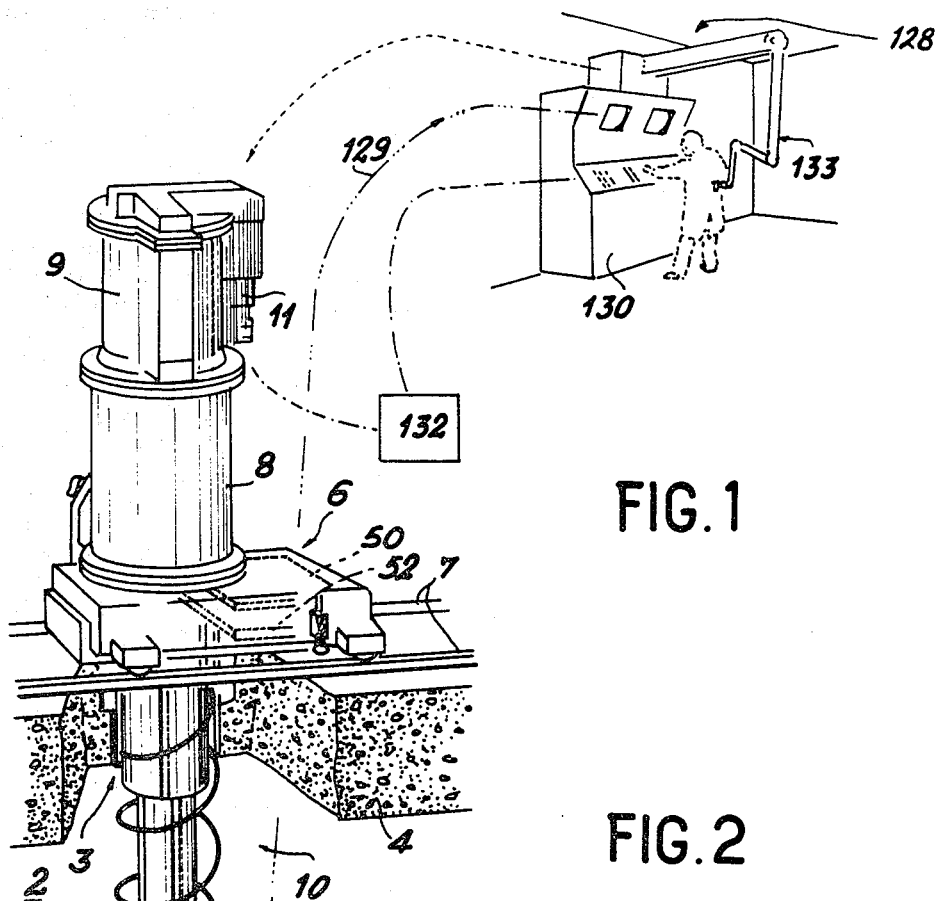
FIGS. 1 and 2 the remote manipulation assembly according to the invention in the working position and in the bent back position.
Figure 2:
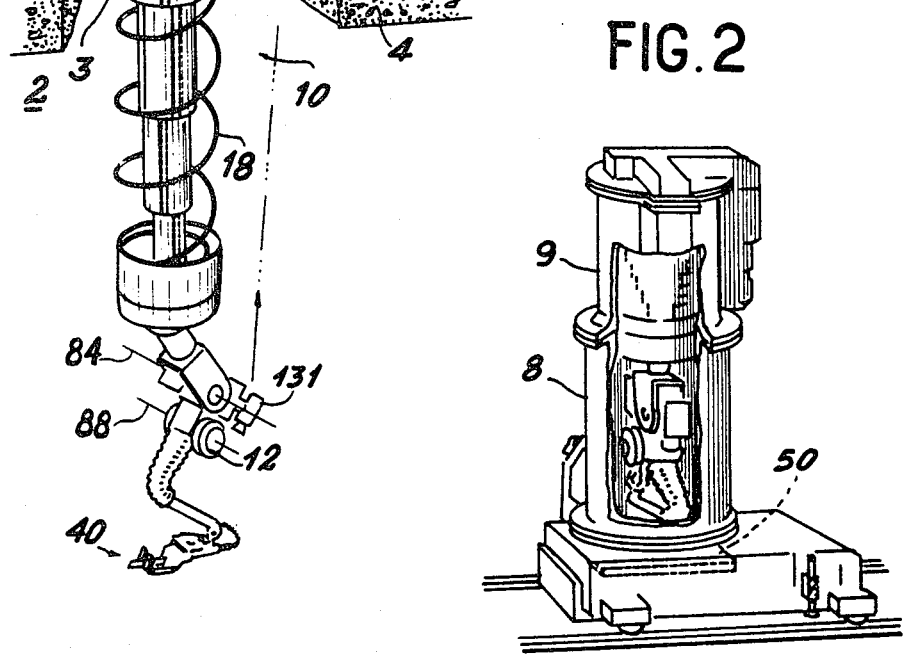

FIGS. 1 and 2 show a remote manipulation assembly according to the invention. This assembly makes it possible to obtain access to the interior of an enclosure 2 containing a hostile medium, e.g. radioactive medium, by means of the only opening 3 which must always exist in said enclosure and which is made in the upper wall or roof 4 thereof. The remote manipulation assembly comprises a platform 6 able to travel e.g. on rails 7 located on roof 4. Platform 6 carries a hood 8 of axis (AA) (See FIG. 3) into which can be completely retracted in the manner shown in FIG. 2 the telescopic carrying assembly supporting at its end a remote manipulation arm 12 of per se known type. In its upper part, hood 8 has a recess 9 containing a device for letting out and hauling in cables. A motor 11 controls a carrying assembly 10. Hoses 18 make it possible to supply the remote manipulation arm and its tools, such as 40.

In its lower part, hood 8 is provided with shielding and sealing means 50, 52 permitting a tight shielded connection to the roof 4 of enclosure 2. A sliding closing device makes it possible to seal the remote manipulation assembly prior to its disconnection from the working station. Thus, hood 8 also serves as a confinement enclosure for a hostile atmosphere. The thickness of the shielding of the closing device, after disconnection, gives protection against irradiation from the assembly and internal contamination. Moreover, the piped geometry of the leaks of the enclosure makes it possible to limit the shielding of hood 8, at least in its upper part.

Figure 3:
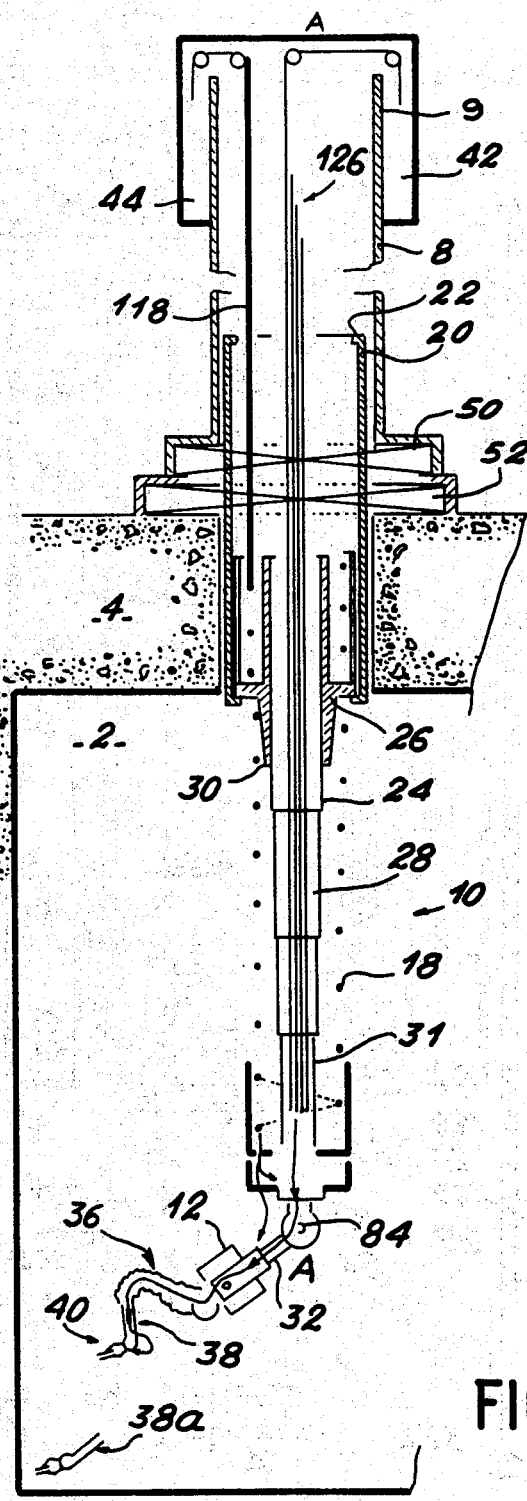
FIG. 3 is a sectional view of the remote manipulation assembly of FIGS. 1 and 2 in the working position.
Figure 4:
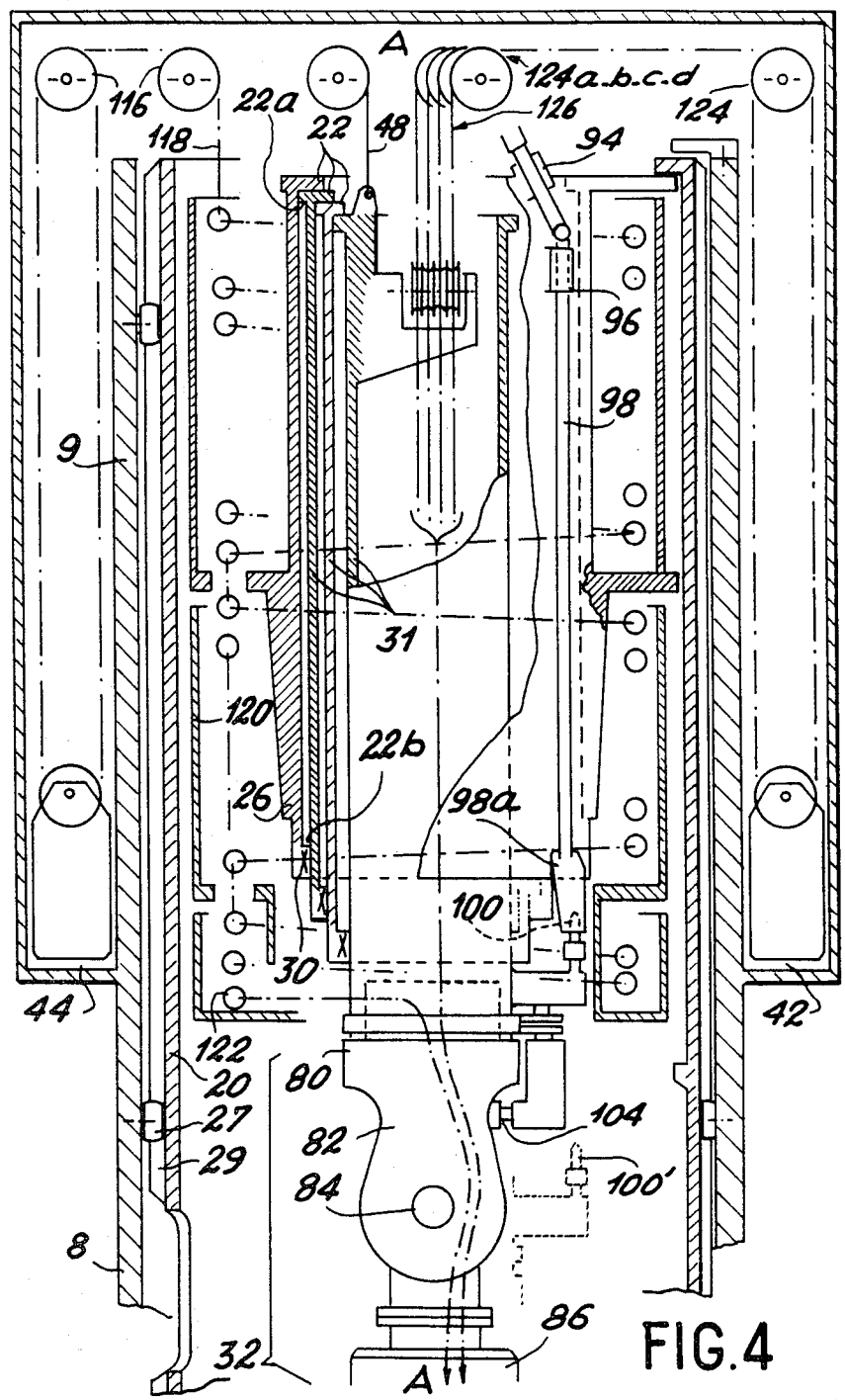
FIG. 4 a detailed view showing the telescopic carrying assembly in the bent position.

FIG. 3 is a sectional view of the remote manipulation assembly according to the invention in the opened position, whilst FIG. 4 is a similar view in the bent back position. These drawings show in particular detail the telescopic carrying assembly 10, which comprises a sleeve 20, whose length is the maximum available length within the hood 8. It slides freely within the hood body, being guided by rails 29 and rollers 27 (FIG. 4). In the described embodiment, there is only one sleeve 20. However, if this is made necessary by the depth of enclosure 2, there can be a plurality of sleeves 20 sliding within one another in such a way as to constitute a primary telescopic carrying means. Conversely, in the case of a smaller travel, sleeve 20 can coincide with the inner wall of hood 8.

A secondary telescopic assembly 24 slides within sleeve 20. This assembly comprises a carriage 26, which is shown in its completely opened out position (FIG. 3). Carriage 26 is guided by rollers within sleeve 20, the latter carrying the rails and the carriage carrying the rollers. The rails and rollers are not shown because they are inserted between the rails and the rollers 27, 29 (FIG. 4) and are outside the plane of the drawing. Carriage 26 carries a telescopic assembly 28 constituted by a plurality of tubes 31 nesting into one another. By its upper part, telescopic assembly 28 is fixed within the lower part 30 of carriage 26.

In the lower part of telescopic assembly 28 is mounted an orientation support 32 formed by a plurality of articulated elements and having at least three degrees of freedom. The orientation support 32 makes it possible to connect the lower part of the telescopic assembly 28 to the remote manipulation arm 12. The latter can, in a preferred form, be a per se known source return and servo-control arm. It has two articulated components 36, 38 and is terminated by a gripping means which can carry a tool 40.

In FIG. 3, it is possible to see the secondary telescopic carrying means 24 opened out within the enclosure 2. Remote manipulation arm 12 is also shown in the extreme opened-out position 38a, which enables it on the ground to reach the angle of cell 2. For example, it reaches the ground with a radius of 2 meters with respect to axis AA of the assembly, which in the present drawings, essentially coincides with the axis of opening 3 (FIG. 1) made in wall 4.

According to a not shown variant, fork 86 (See FIG. 4) carrying the remote manipulation arm 12 can give the assembly a second telescopic extension movement making it possible to increase the horizontal overhanging access described hereinbefore to e.g. 3 meters.

Thus, support 32 has at least three degrees of freedom: the rotation of vertical axis AA, the rotation of shoulder axis 84, the pivoting of axis 88 (See FIG. 6) and optionally a complementary telescopic movement in accordance with the plane of fork 86 having a longitudinal axis 86a. The fluids required by the tools are supplied up to the gripping means 40 of remote manipulation arm 12 and make it possible to supply hydraulic, electrical or pneumatic tools. For this purpose, a storage unit 44 is provided for the fluid spply hoses 18 in order to compensate the different travels or strokes of the apparatus. A multipulley system 116 (See FIG. 4) compensates the downward stroke of sleeve 20 in the body of hood 8 and makes it possible to ensure the travel necessary for the fluid supply hoses 18 of tools 40 and remote manipulation arm 12.

The travel of electric cable 118 is limited to the travel of carriage 26, plus the travel of sleeve 20. Thus, hoses 18 are fixed to the upper part of carriage 26. It is therefore the helical device 18 shown in FIGS. 1 and 3 which permits the extension of the supply hoses 18 helically wound around the secondary telescopic carrying means 24 during the movement of the latter.

In the retracted position of the secondary telescopic carrying assembly 24, a storage unit 120 (See FIG. 4) fixed to its lower component 31 makes it possible to collect the supply hoses. In order to maintain the sealing of the remote manipulation assembly, the supply intake is external and for this purpose a not shown wall duct connector is used.

In the upper part of hood 8, outside recess 9, there is also a storage unit 42 for the electric cables. This unit is designed so as to ensure the complete travel of the moving components of the carrying assembly 10, i.e. the primary telescopic carrying means 20 and secondary means 24.

A multipulley system 124 is similar to system 116, but has four reels 124a and 124d corresponding to four electric cables 126, which themselves correspond to the different supplies and to the data return of support 32 and remote manipulation arm 12. Unlike in multipulley system 116, multipulley system 124 is rigged with pulley blocks for the complete travel of the carrying assembly 10.

FIG. 3 also diagrammatically shows the shielding and sealing means 50, 52 making it possible to connect the remote manipulation assembly according to the invention to the upper wall 4 of enclosure 2. These means will be described in greater detail with reference to FIG. 5, as will the corresponding connection process.

In FIG. 4, it is possible to see at 48 the entrance of a running-out cable fixed to the lower tube 31, i.e. the smallest diameter tube of the secondary telescopic carrying assembly 24. The playing-out motor and the take-up device for the cable are positioned outside cylindrical recess 9 (cf FIGS. 1 and 6). Each tube 31 of the telescopic carrying means 24 has in its upper part and towards the inside, an abutment 22. When cable 48 has completed the retraction of telescopic member 31 to which it is fixed, by means of abutment 22 of the latter it raises the member 31 which is immediately external thereof and so on up to sleeve 20. Thus, it is possible to retract the complete carrying assembly by means of a single winch and a single motor. In the present embodiment, the opening out or extension of the telescopic assembly takes place by gravity from the outside towards the inside up to abutments 22a, 22b of carrying assembly 10 or hood 8 bring about the start of the extension of the following inner member, tube 31 or sleeve 20. All the tubes such as 31 are guided by rails and rollers (not shown).

According to a variant, the remote manipulation assembly according to the invention can function in a non-vertical direction. The opening-out or extension system described hereinbefore must then be associated with a positive control device.

Below storage unit 120 it is possible to see three coils 122 which absorb the rotation of rotary member 80 and not by the telescopic travel of the secondary carrying means.

These drawings do not show the playing-out device or winch, which is constructed in a per se known manner. A known chain tension detection device automatically brings about the stoppage of the winch when cable 48 slackens, e.g. in the case of the telescopic carrying means 10 or remote manipulation arm 12 encountering an obstacle liable to hold back the weight of the assembly.

Figure 5:
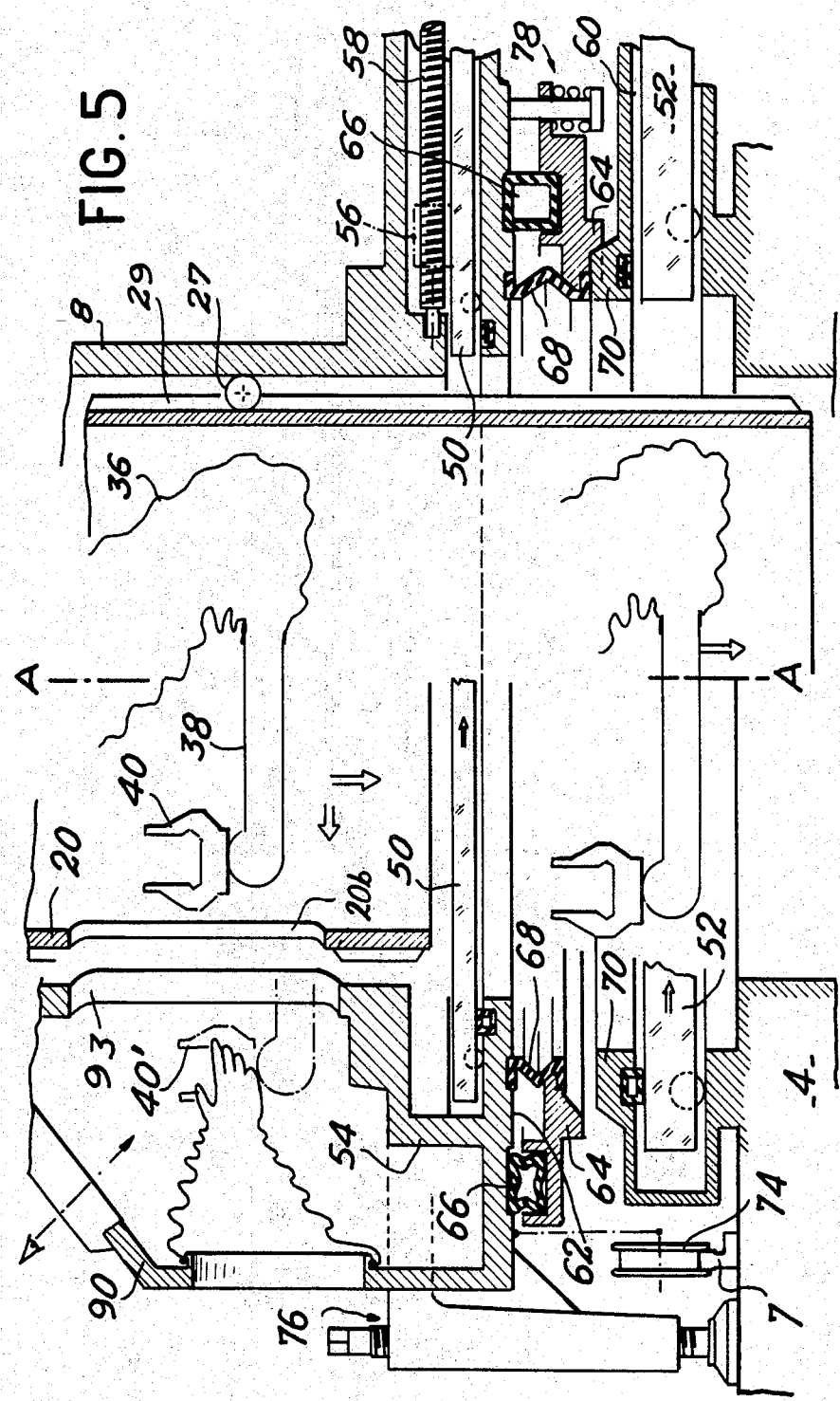
FIG. 5 a detailed view of the tightly sealed connection to the enclosure wall.

FIG. 5 is a detailed view of the connection of the remote manipulation device to the enclosure wall or roof 4. A closing device 50 approaches as closely as possible to the underside of the retracted sleeve 20. Facing closing device 50 there is a cover 52 forming part of the cell in which intervention is to take place by means of the remote manipulation assembly. It should be noted that the shielding thickness of closing device 50 significantly exceeds that of cover 52. Closing device 50 moves perpendicular to the axis AA of hood 8, i.e. in this case horizontally. It is driven within the walls 54, thereby ensuring the continuity and sealing of hood 8. Walls 54 form a casing receiving the closing device 50 when it is open. FIG. 5 diagrammatically shows a drive mechanism using nut 56 and screw 58.

In an identical manner, cover 52 moves perpendicularly to the axis AA of the hood, i.e. horizontally for retracting into a casing 60 integral with the upper wall 4 of the enclosure.

The hood also has a lower surface 62 relative to which a circular flange 64 can be displaced vertically, e.g. by means of an inflatable joint 66. A sealing bellows 68 ensures a tight connection between surface 62 and flange 64. Flange 64 is matched to a complementary flange 70 integral with the upper surface of casing 60, i.e. it is integral with the upper wall 4 of enclosure 2. If necessary, a gasket is provided between flanges 54 and 70.

The device for raising and lowering flange 64 serves to mitigate the impossibility of placing the very heavy assembly on flange 70. It is for this reason that during the operation the assembly rests on fixed supports such as 76, which permit the immobilization thereof relative to the enclosure. In the left-hand part of FIG. 5, it is possible to see flange 64 in the raised position with in the right-hand part thereof flanges 64 and 70 in contact with one another, sealing bellows 68 preventing contamination of the outer areas. Flange 64 is raised by springs 78 shown in the right-hand part of FIG. 5 on deflating the inflatable joint 66.

The connection of a remote manipulation assembly according to the invention to an opening 3 made in the roof of enclosure 2 is preferably carried out by maintaining the continuity of the shielding and confinement of the remote manipulation assembly and enclosure 2 before, during and after the connection and disconnection thereof.

However, in practice, it is accepted that the contaminated surfaces can be vented during disconnection. In this case, the sealing and shielding of enclosure 2 are brought about by the cover 52 moving in translation within a casing integral with wall 4 and by a flange 70 integral with the casing. Flange 64, which is able to move up and down and which is positioned in the lower part of hood 8, is engaged with flange 70. The sealing and shielding of hood 8 are brought about by the closing device 50 moving in translation within a casing 54 fixed to the lower surface 62 of hood 8. As a result of electrical safety devices, disconnection is only possible when cover 52 and closing device 50 are closed.

FIG. 5 diagrammatically shows a rail 7 positioned on wall 4. An identical, but not shown rail is located on the other side of axis AA, but at a greater distance therefrom. Platform 6 (See FIG. 1), which is provided with wheels such as 74, can move on the said rails so that it is brought into a facing position with respect to the intervention opening made in wall 4.

As can be seen in FIG. 1 where these rails are symmetrical, the platform can follow two perpendicular paths as a result of orientable wheels.

Figure 6:
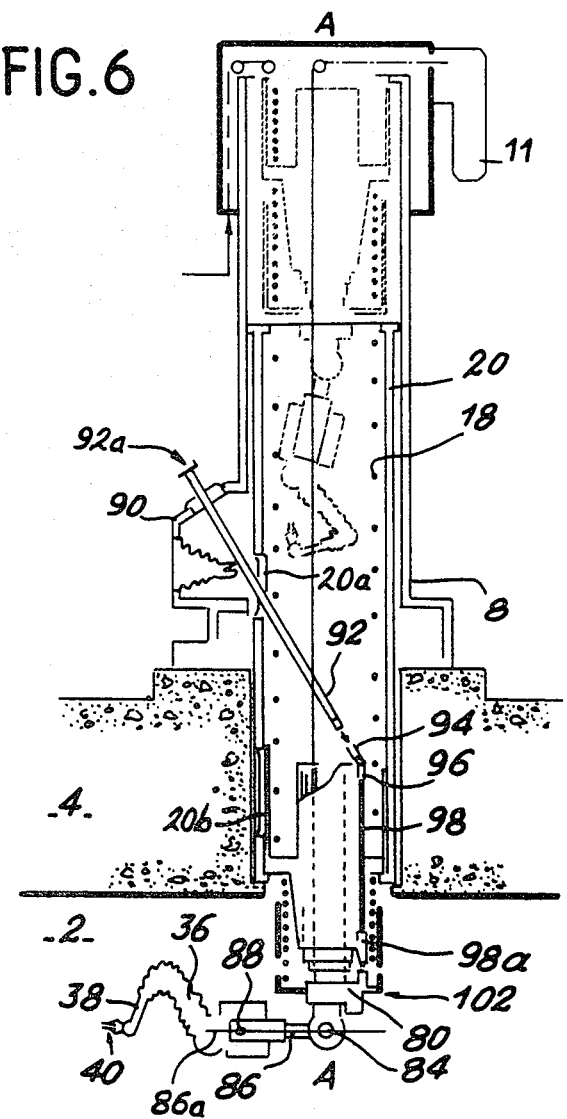
FIGS. 6 and 7 the auxiliary actuator for the shoulder axis of the orientation support for the remote manipulation arm.

As can be seen in FIGS. 4 and 6, the orientation and transverse displacements support 32 comprises components 80 of a geared motor for a rotary movement about axis AA of carrying assembly 10. In the area of shoulder 82, it also involves the motorization of a pivotal movement about axis 84, called the shoulder axis and shown from the end in FIGS. 4 an 6. Shoulder axis or spindle 84 carries a fork 86 having a pivoting axis parallel to shoulder axis 84. The remote manipulation arm 12 shown in FIG. 3 pivots about axis 88.

In the case of a breakdown, orientation support 32 can be locked in a position for which the manipulation arm 12 is not aligned in fork 86 and the latter is not aligned with axis AA of the remote manipulation assembly. This prevents the raising of carrying assembly 10 through opening 3 made in wall 4 and its reinsertion into sleeve 20.

Figure 7:
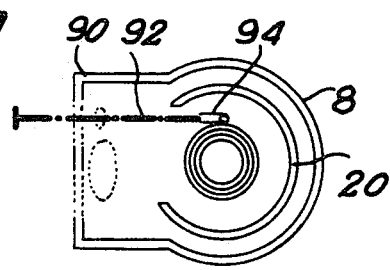

To obviate this disadvantage, intervention is possible in the case of a repair by means of an intervention box 90 diagrammatically shown in FIGS. 6 and 7. As a function of the particular case, this auxiliary action can be a simple disconnection permitting the assembly to pendulate by gravity and/or a direct action on the control mechanism for the said movements. By means of the intervention box 90, a rotary shaft 92, having a handle 92a, is introduced and is connected at 94 to a square drive fixed to the upper part of tube 31 outside the secondary telescopic carrying assembly 24 (See FIG. 3).

In order to permit the passage of shaft 92 an opening 93 (See FIG. 5) is made in the wall of hood 8 facing intervention box 90. A first opening 20a is also made in sleeve 20 in a position corresponding to its lowered position.

When the primary telescopic carrying assembly has a plurality of sleeves such as 20, it is obviously necessary to make an opening in each sleeve.

By means of a universal joint 96, shaft 92 permits the actuation of a shaft 98 parallel to axis AA. When the secondary telescopic carrying means 24 is in the completely retracted position, end 98a of shaft 98 engages with a square drive 100 (See FIG. 4) integral with lower tube 31 of the secondary telescopic carrying means 24. By means of levers, intake 104 is actuated from the square drive 100.

It should be noted that the levers, which are not shown in detailed form here, must make it possible to actuate intake 104 no matter what the rotation position of fork assembly 86 with respect to support box 80.

It is pointed out that this repair or fault removal apparatus is carried out in the integral retracted position of the secondary telescopic carrying assembly and in the maximum extended position permitted by the opening in sleeve 20.

Returning to FIG. 5, it is possible to see that sleeve 20 has in its lower part a second opening 20b which, when it is in the raised position, faces opening 93 made in the body of hood 8. This permits access through the intervention dry box 90 to the components and tools 40 of remote manipulation arm 12 and not to the emergency controls for the shoulder spindle drive. Thus, in the left-hand part of FIG. 5, gripping device 40 is shown in a position 40' where fore-arm 38 has been brought into the volume of intervention box 90 for carrying out a change of tools or a minor repair. Thus, intervention box 90 is at the same time a gripping device or dry box. The thickness of its wall is comparable to that of hood 8, so as to ensure the continuity of shielding required during the opening of the remote manipulation assembly of the enclosure 2. It is pointed out that the interventions referred to here make it necessary to close the cover 52.

It is apparent from the above description that the devices according to the invention permit for a given overall height to obtain a very considerable extension length reaching in the present case approximately 7.8 m, whilst the hood has a height of approximately 4.3 m and contains in the retracted position all the manipulation, extension, lifting and sealing members.

It is also apparent that through the arrangement of the various components and members, maintenance of the apparatus is possible, provided that a maintenance room comparable to that intended for interventions is provided, i.e. having an entrance of the same type in the ceiling. At this level, it is merely necessary to provide a larger opening in order to obtain easy access for cleaning and decontamination of the areas between the closing device 50 and cover 52. Thus, by using an auxiliary abutment stopping the downward travel of sleeve 20 and by eliminating for maintenance the bottom abutment of carriage 26 in said sleeve, it is possible to lower into the maintenance room the complete secondary telescopic means and its helically open-out hoses. After removing these essential components for maintenance after decontamination, it is clear that it is also easy to lower the sleeve out of the normal abutment, clean it and repair it, whilst then having access to the complete inner free surface of the hood, which essentially only contains the fluid or electrical connections and the guidance rails. Its size is then favourable for possible human intervention for maintenance purposes following decontamination.

It should also be noted that the complete assembly is controlled, from the time of its installation, from a control station 128 shown in FIG. 1, which is positioned at a distance and is connected to the assembly by data return and supply cables 129, which in particular transmit television signals giving on console 130 pictures from camera 131 carried by manipulation arm 12, as well as the fluids and supply for the motors, such as that of winch 11 actuating the telescopic means coming either from station 128 or supply 132 within the intervention room.

Console 130 also has the data controls and return means from all the components of the assembly, the master arm 133 which is similar to manipulator 12 enabling the operator to remotely carry out the various tasks by means of tools such as 40. All the operations, with the exception of the taking up of tools carried out by means of intervention box 90, can be performed without direct human action, which minimizes the need for shielding the hood, particularly in view of the fact that the cover 52 forming part of the high activity enclosure reduces the radiation dose to a normal value when it is closed. Thus, simultaneously this apparatus enables personnel to work under completely irradiation-free and contamination-free conditions.

Finally, the dimensions of the remote manipulation assembly form no obstacle to its obtaining access to installations or its transportation between remote installations.

What is claimed is:

1. A remote manipulating assembly comprising a movable platform (6) carrying a telescopic supporting or carrying assembly at the end of which a multi-part, multi-jointed remote manipulation arm (12) can be displaced inside an enclosure, wherein the platform is located on a wall of the enclosure, at least one opening being provided in the wall to permit the introduction of the telescopic carrying assembly having a longitudinal axis (AA) into the enclosure, and wherein the platform is provided with a hood (8) within which the telescopic carrying assembly and the remote manipulation arm can be completely contained, the hood also being provided in its opening part with means for the tight connection to the wall of the enclosure cooperating with sealing means provided in the opening, and having at its other end means for controlling the displacements of the telescopic carrying assembly, whilst also having connection and supply means for the displacements of the remote manipulation arm, together with its operation and the operation of its tools said telescopic carrying assembly being constituted by a primary telescopic carrying means sliding within the hood and which comprises at least one sleeve (20) whose length is equal to the free internal height of the hold and a carrying carriage (26) moving within the sleeve of the primary telescopic carrying means and carrying a secondary telescopic carrying means supporting said remote manipulation arm, said secondary telescopic carrying means being comprised of a plurality of telescoped tubes (31) each of a length less than the length of said sleeve (20) to allow containment of said tubes and said manipulation arm within said sleeve when said tubes and sleeve are retracted into said hood.

2. A remote manipulating assembly comprising a movable platform carrying a telescopic supporting or carrying assembly at the end of which a remote manipulation arm can be displaced inside an enclosure, wherein the platform is located on a wall of the enclosure, at least one opening being provided in the wall to permit the introduction of the telescopic carrying assembly having a longitudinal axis (AA) into the enclosure, and wherein the platform is provided with a hood within which the telescopic carrying assembly and the remote manipulation arm can be completely contained, the hood also being provided in its opening part with means for the tight connection to the wall of the enclosure cooperating with sealing means provided in the opening, and having at its other end means for controlling the displacements of the telescopic carrying assembly, whilst also having connection and supply means for the displacements of the remote manipulation arm, together with its operation and the operation of its tools wherein the tight connection means to the wall of the enclosure comprise a closing device moving in translation within a casing fixed to the lower surface of the hood and a first flange sealingly connected to the surface and provided with raising and lowering means, whilst it is matched to a second flange integral with the wall.

3. A remote manipulation means according to claim 2, wherein the means for raising and lowering the first flange are protected against contamination by a bellows.

4. A remote manipulating assembly comprising a movable platform carrying a telescopic supporting or carrying assembly at the end of which a remote manipulation arm can be displaced inside an enclosure, wherein the platform is located on a wall of the enclosure, at least one opening being provided in the wall to permit the introduction of the telescopic carrying assembly having a longitudinal axis (AA) into the enclosure, and wherein the platform is provided with a hood within which the telescopic carrying assembly and the remote manipulation arm can be completely contained, the hood also being provided in its opening part with means for the tight connection to the wall of the enclosure cooperating with sealing means provided in the opening, and having at its other end means for controlling the displacements of the telescopic carrying assembly, whilst also having connection and supply means for the displacements of the remote manipulation arm, together with its operation and the operation of its tools said carrying assembly being constituted by a primary telescopic carrying means sliding within the hood and which comprises at least one sleeve whose length is equal to the free internal height of the hood and a carrying carriage moving within a sleeve of the primary telescopic carrying means and carrying on its inner end a secondary telescopic carrying means said remote manipulation assembly including connection means between the manipulator and the opening of an enclosure, wherein continuity of the shielding and confinement of the remote manipulation assembly and of the enclosure are ensured before, during and after connection or disconnection of the manipulator from the enclosure said remote manipulation assembly including a cover moving in translation within a casing integral with the wall of the enclosure and including a second flange integral with a casing and on which is engaged a first flange located in the lower part of the hood and provided with a raising and lowering movement, the sealing and shielding of the hood being provided by a closing device moving in translation within a casing fixed to the lower surface of the hood, disconnection only being possible when the closing device and cover are closed.

* * * * *